United States Patent [19]
Tochihara et al.

[11] Patent Number: 5,351,789
[45] Date of Patent: Oct. 4, 1994

[54] POSITIONING MECHANISM

[75] Inventors: Isao Tochihara; Osamu Yamashita; Mitsunori Sano; Tomoyuki Takahashi; Makoto Nakano, all of Tokyo, Japan

[73] Assignee: NEC Corporation, Tokyo, Japan

[21] Appl. No.: 842,639

[22] Filed: Feb. 27, 1992

[30] Foreign Application Priority Data

Feb. 28, 1991 [JP] Japan .................. 3-033935

[51] Int. Cl.⁵ .................. B65H 59/10; H01L 41/08
[52] U.S. Cl. .................. 188/67; 310/328; 192/142 R
[58] Field of Search .................. 188/67, 156, 157; 192/138, 142 R; 310/328, 323; 92/5 R

[56] References Cited

U.S. PATENT DOCUMENTS

| | | | |
|---|---|---|---|
| 3,902,085 | 8/1975 | Bizzigotti | 310/328 |
| 4,096,608 | 6/1978 | Largerstedt | 188/67 |
| 4,622,483 | 11/1986 | Staufenberg et al. | 310/328 |
| 4,681,667 | 7/1987 | Utsumi et al. | 204/15 |
| 4,714,855 | 12/1987 | Fujimoto | 310/328 |
| 4,727,278 | 2/1988 | Staufenberg et al. | 310/328 |
| 4,769,569 | 9/1988 | Stahlhuth | 310/328 |
| 4,779,513 | 10/1988 | Kimura | 188/67 |
| 4,854,424 | 8/1989 | Yamatoh et al. | 188/72.1 |
| 5,039,900 | 8/1991 | Nashiki et al. | 310/328 |
| 5,055,760 | 10/1991 | Nashiki et al. | 310/309 |
| 5,090,518 | 2/1992 | Schenk et al. | 188/72.1 |
| 5,182,484 | 1/1993 | Culp | 310/328 |

*Primary Examiner*—Robert J. Oberleitner
*Assistant Examiner*—Chris Schwartz
*Attorney, Agent, or Firm*—Leydig, Voit & Mayer

[57] ABSTRACT

A positioning mechanism includes a housing, at least one holding member inserted into a lateral opening formed in the housing at the side wall, thereof and an electrostrictive effect element mounted on the holding member. When the electrostrictive effect element is energized, it expands to urge the holding member against a moving member which is to be stopped and held a desired location.

1 Claim, 5 Drawing Sheets

POSITIONING MECHANISM

BACKGROUND OF THE INVENTION

1. Field of the Invention

The present invention relates to a positioning mechanism for stopping and holding a movable part in place, the movable part being moved from one location to another by an electrically, pneumatically, hydraulically or magnetically actuated mover.

2. Description of the Related Art

Conventional industrial machines and particularly producing installations frequently utilize a sizing feed mechanism which can move a movable part such as a workpiece or a movable machine section from one location to a desired location and then stop and hold the moved part or machine section at the desired location. In general, such a sizing feed mechanism comprises a drive mechanism for moving the movable part and a positioning mechanism for stopping and holding the moved part at the desired location. The sizing feed mechanism may be powered electrically, magnetically, pneumatically or hydraulically. The positioning mechanism may be in any form of a frictionally or magnetically braking mechanism for stopping and holding the workpiece or machine section or a simple mechanism including a machine section such as an abutment member located at the desired location, the abutment member being engaged by the workpiece or machine section to stop and hold it at the desired location.

One such frictionally or magnetically braking mechanism is a table feed mechanism in a machine tool such as a milling machine. The table feed mechanism uses an electric motor to rotate a feed screw connected to the table. When the feed screw is rotated by a predetermined amount, a clutch-brake system is actuated to break the transmission of rotation and at the same time to hold the feed screw at the stopped location to prevent the inertial rotation of the feed screw. Thus, the table may be positioned in place. There is also known an automatic feed mechanism adapted to rotate a feed screw stepwise by means of a pulse motor and to hold the feed screw at the desired location under the influence of a magnetic field produced by the pulse motor after the feed screw has been rotated by a predetermined amount. This can also prevent the inertial rotation of the feed screw. Such frictionally and magnetically positioning mechanisms or sizing feed mechanisms can be used only in specific applications wherein the amount of feed is variable and determined with high accuracy.

In other production installations, however, a positioning mechanism including a machine section such as an abutment member arranged to perform the direct mechanical arrestment of the moving part is generally used since it has a simplified and inexpensive structure if used as a sizing feed mechanism. This positioning mechanism can determine the distance of movement in various movers such as the piston rod of a pneumatic or hydraulic cylinder, the feed nut of an electrically actuated rotational feed screw, and the plunger of an electromagnetic solenoid. In many applications, the abutment member is adapted to engage the piston end, nut or plunger end. Therefore, the direct positioning mechanism must include an abutment member arranged in the path of movement of the pneumatical cylinder, hydraulic cylinder, feed screw nut or electromagnetic solenoid and a sensor located parallel to the abutment member for detecting the movable part and cutting it off from a power source.

The above-mentioned braking and positioning mechanisms require expensive parts such as clutches and brakes which possess functional limitations even if a high-speed sequence circuit is used to control them. Furthermore, the clutches and brakes take a long time to respond to the sequence control circuit, so that the movable part will move to an undesired location until it is completely stopped. This results in inaccurate positioning and makes the entire mechanism more complicated and expensive. If a pulse motor is used, accurate positioning operation can be accomplished, but it is required to design a drive mechanism having as small an inertial force as possible or to control the speed of the drive mechanism in a complicated manner. Therefore, the sizing feed mechanism is inevitably complicated and expensive.

On the other hand, a direct positioning mechanism utilizing an abutment member for stopping and holding a movable part is less expensive. If a pneumatic or hydraulic cylinder is used in the sizing feed system, however, the mechanical responsiveness in these cylinders is low. Thus, the position of the pneumatic or hydraulic cylinder stopped and held is not constant, and the accuracy is poor even if a sensor for detecting the stoppage of the movable part actuates at high speed. Since the stroke of the pneumatic and hydraulic cylinder is determined at the time of manufacture, the distance of movement cannot be changed during the operation of the device. The use of the feed nut driven by an electrically rotated feed screw is more general, but requires a more complicated and expensive mechanism.

SUMMARY OF THE INVENTION

It is therefore an object of the present invention to provide a high-accuracy positioning mechanism which can be constructed less expensively and more compactly in size.

In one aspect of the present invention, a positioning mechanism comprises a moving member, at least one holding member adapted to be urged against the moving member, an electrostrictive effect element mounted on the holding member for providing a pressing force to the holding member, and a supporting member on which the electrostrictive effect element and holding member are mounted.

In another aspect of the present invention, the supporting member may include a bore formed therethrough, the bore receiving and surrounding the moving member.

In still another aspect of the present invention, the bore may be adapted to slidably guide the moving member.

In a further aspect of the present invention, plural pairs of the electrostrictive effect element and holding member may be provided such that they are radially arranged with equidistance around the path of movement of the moving member.

In a further aspect of the present invention, the holding member may comprise a lever member mounted on the electrostrictive effect element through a pivot pin, the lever member including a pressing portion formed thereon to be urged against the surface of the moving member, and the supporting member may include a fulcrum pin formed thereon to pivotally hold the lever member at one end.

In a further aspect of the present invention, the pressing portion may include a projection formed thereon and having a sectional configuration which is fittable into a groove formed in the surface of the moving member.

The electrostrictive effect element in the present invention includes all known elements which can provide a pressing force to a holding member, such as a laminated-type electrostrictive effect element described in U.S. Pat. No. 4,681,667.

BRIEF DESCRIPTION OF THE DRAWINGS

The aforementioned and other objects, features and advantages of the present invention will become more apparent from the following description considered with reference to the accompanying drawings, wherein.

DETAILED DESCRIPTION OF THE PREFERRED EMBODIMENTS

Now, the present invention will be described with reference to the accompanying drawings.

Figure 1A:
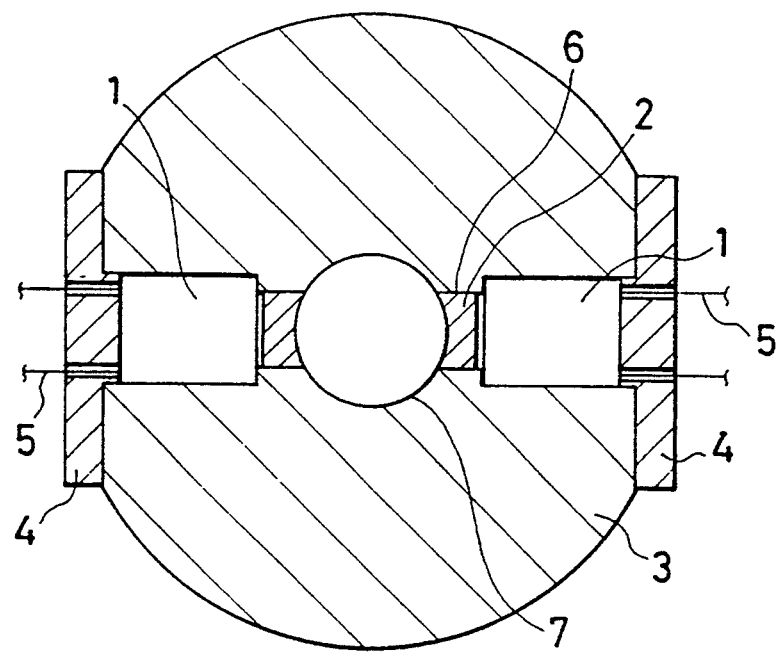
FIG. 1(a) is a cross section of one embodiment of a positioning mechanism constructed in accordance with the present invention.
Figure 1B:
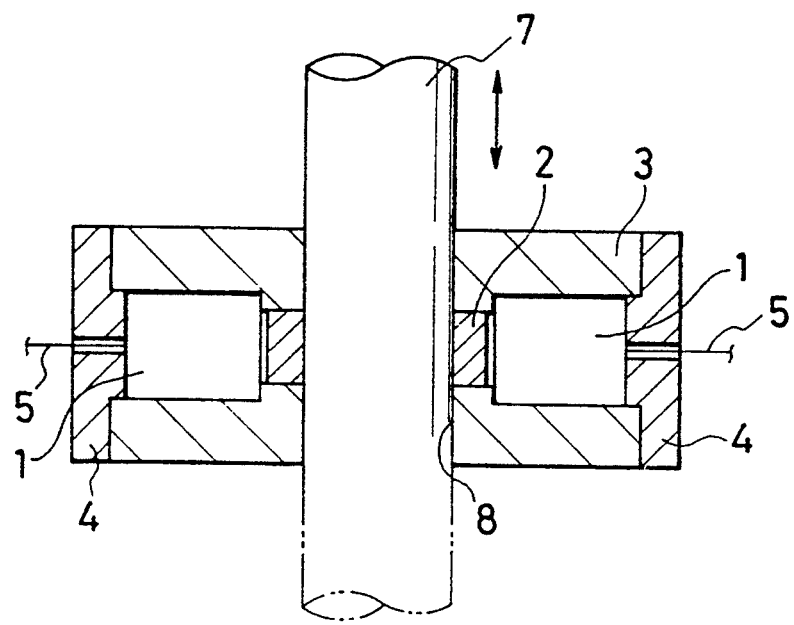
FIG. 1(b) is a longitudinal section of the positioning mechanism shown in FIG. 1(a)

Referring to FIGS. 1(a) and 1(b), there is shown a positioning mechanism which comprises a cylindrical housing 3 including a bore or opening 8 formed therethrough, through which a movable or moving shaft 7 can be slidably moved in the direction of the double-headed arrow in FIG. 1(b). A holding member 2 is slidably moved through a lateral opening 6 which is formed in each of the opposite sides of the housing 3, the holding member being in the form of a brake shoe: an electrostrictive effect element 1 is attached to the holding member 2 at one end and adapted to urge the holding member 2 against the movable shaft 7 when energized; a keeping plate 4 is mounted on the housing 3 to hold the corresponding electrostrictive effect element 1 in the lateral opening 6 of the housing 3.

When the electrostrictive effect element 1 is not energized, the movable shaft 7 can move relative to the housing 3 in the bore 8 thereof in a direction of the arrow in FIG. 1(b). The radial gap or clearance between the inner wall of the bore 8 and the surface of the movable shaft 7 may be set to be about 0.005 mm such that the movable shaft 7 can move smoothly and accurately in the bore 8. The gap between each of the holding members 2 and the movable shaft 7 is within the range of the strain in the electrostrictive effect element 1. In other words, the holding members 2 will not be in contact with the movable shaft 7 when the electrostrictive effect elements 1 are not energized. For example, if each of the electrostrictive effect elements 1 is of a laminated-type as described in U.S. Pat. No. 4,681,667 and having a length of 20 mm and measuring on a side 5 mm, the gap between each of the holding members 2 and the movable shaft 7 is set to be equal to 0.02 mm. Thus, the holding members 2 do not come into contact with the movable shaft 7 because the gap is bigger than that between the movable shaft 7 and the inner wall of the bore 8.

When the movable shaft 7 is moved relative to the housing 3 by a preselected distance, a voltage (about 150 volts DC) is applied from a sensor or a pre-programmed sequence control to the electrostrictive effect elements 1 through leads 5. As a result, each of the electrostrictive effect elements 1 expands to urge the corresponding holding member 2 against the movable shaft 7 to stop the motion thereof under friction. Each of the holding members 2 should be made of a material having a high frictional coefficient and a high hardness, such as a hard rubber or the like. When it is assumed that the urging force is equal to 20 kg/cm$^2$, the area of contact of the holding member 2 with the movable shaft 7 is equal to 0.25 cm$^2$ and the frictional coefficient is equal to 1, the illustrated arrangement can totally provide a braking or frictional force equal to 10 kg (the two holding members) against the movable shaft 7.

In order to avoid any excessive movement of the movable shaft 7 due to inertia force under any delay of voltage application, it is preferred to set the timing between the voltage application to the electrostrictive effect elements 1 and the shut-off of the power source as follows. For example, if the drive power is larger than the frictional force, the drive power will be shut off from the movable shaft 7 at the same time as the voltage is applied to the electrostrictive effect elements 1. If the drive power is smaller than the frictional force, the drive power will be disconnected from the movable shaft 7 at the same time or slightly later than when the voltage is applied to the electrostrictive effect elements 1. Even if such a timing control is not made, the movable shaft 7 moving at a speed equal to 100 mm/sec can be stopped within a distance equal to about 0.05 mm at the worst if the magnitude of strain in each of the electrostrictive effect elements 1 when energized is equal to 20 $\mu$m and their response time is equal to 0.5 $\mu$s.

Figure 2:
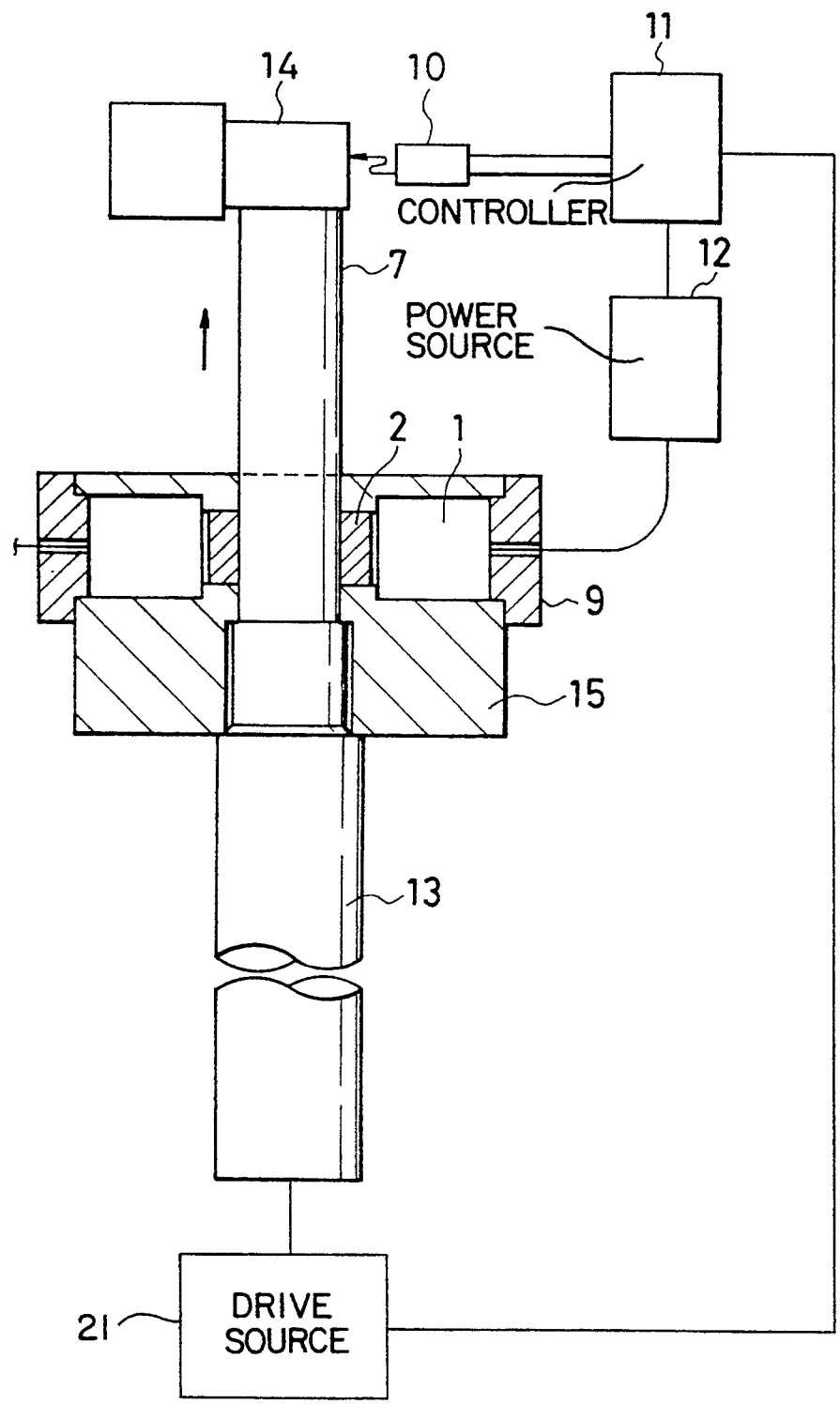
FIG. 2 is a fragmentary section of a sizing feed system utilizing the positioning mechanism shown in FIGS. 1(a) and 1(b)

Referring now to FIG. 2, there is shown a sizing feed system which utilizes the positioning mechanism shown in FIG. 1. The sizing feed system comprises a base 15 and a linear drive 13 such as pneumatic or hydraulic cylinder or linear motor mounted on the base 15. The positioning mechanism 9 is also mounted on the base 15. The movable shaft 7 of the linear drive 13 extends through the bore of the positioning mechanism 9 and supports a part 14 to be moved at the forward end of the shaft 7.

Operation of the sizing feed system is started when the movable shaft 7 is within the bore of the positioning mechanism 9 and the electrostrictive effect elements 1 are not energized. The linear drive 13 is first actuated to move the movable shaft 7 in the direction of the arrow. As the moved part 14 reaches a sensor 10, the sensor 10 detects it and generates a detection signal which is in turn fed to a controller 11. The control 11 then generates and supplies a switching signal to both a drive power source 12 and a drive source 21 for the linear drive 13. As a result, a voltage is applied from the drive power source 12 to the electrostrictive effect elements 1 while at the same time the drive source for the linear drive 13 is de-energized. Thus, the movable strain created in the electrostrictive effect elements 1 causes the holding members 2 to press the movable shaft 7 to stop and hold the movable shaft 7 such that the moved part 14 will be stopped at the desired position.

Since the positioning mechanism of the present invention has an increased accuracy for positioning, however, it is not necessary to employ a sensor for detecting the position of the moved part. Instead, a positioning program sequence may be previously provided in the controller 11 such that the electrostrictive effect elements 1 and linear drive 13 can be sequentially operated in accordance with output signals from the controller 11. Thus, the movable part can be continuously moved to different locations. This is more suitable for the general purpose.

Although in the illustrated embodiment two opposite electrostrictive effect elements are disposed in the housing, the present invention may use only one electrostrictive effect element. This is advantageous in small-sized positioning mechanisms which require only a small holding force. If two or more electrostrictive effect elements are to be used, it is preferred that they be arranged in a geometric configuration which balances the pressing force, such as an opposing configuration, a radial configuration with equidistance, or the like.

Although in the first embodiment a movable shaft moves through a positioning mechanism, the present invention may be applied to a flat movable plate. Also, the present invention may be applied to a non-cylindrical housing. Such an arrangement is satisfactory if the configuration of a housing corresponds to that of the moving mechanism portion. For example, the flat movable plate may be used in a plate-like housing. Since each of the electrostrictive effect elements can be of a simplified construction having a length equal to about 2 mm, the positioning mechanism of the present invention can be applied to video machines, cameras, office instruments, and other devices.

Figure 3A:
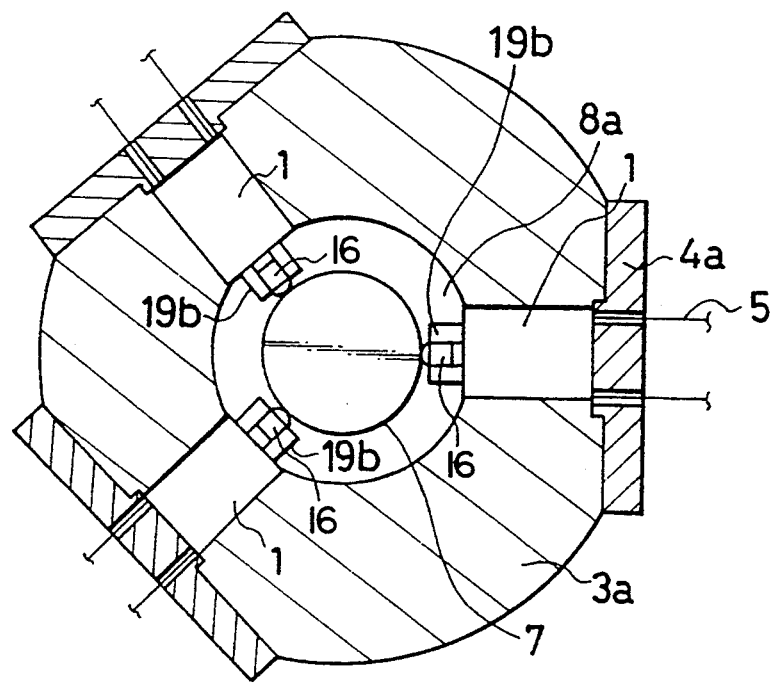
FIG. 3(a) is a cross-section of a second embodiment of a positioning mechanism constructed in accordance with the present invention.
Figure 3B:
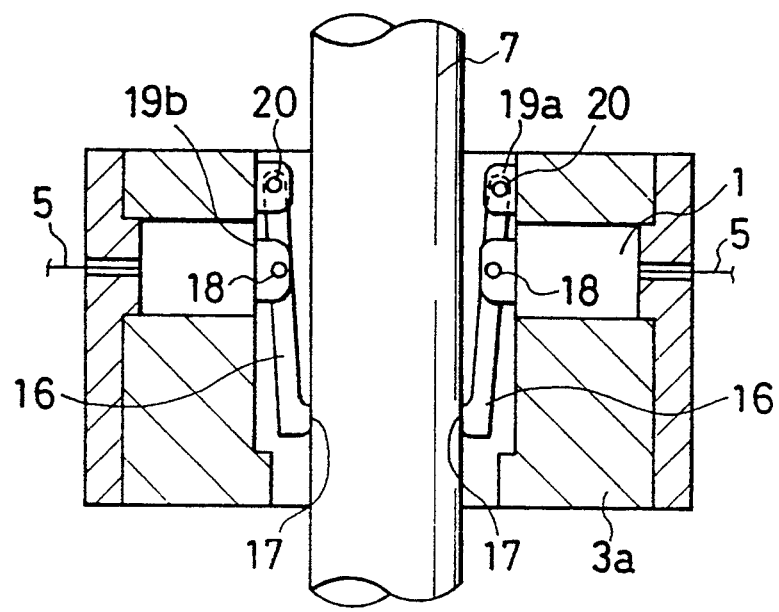
FIG. 3(b) is a longitudinal section of the positioning mechanism shown in FIG. 3(a).

FIGS. 3(a) and 3(b) show a second embodiment of a positioning mechanism constructed in accordance with the present invention. This positioning mechanism is more suitable for use in a relatively large-sized machine. The positioning mechanism comprises a cylindrical housing 3a including a bore 8a formed therethrough, three support members 19a extending inwardly from the inner wall of the bore 8a and angularly spaced away from one another with a prescribed distance, a fulcrum pin 20 embedded in each of the support members 19a, an electrostrictive effect element 1 located within each of lateral openings formed in the housing 3a, three support members 19b mounted on corresponding ones of the electrostrictive effect elements 1 and having a pin 18 formed therein, and a lever 16 pivotally supported at one end by each of the fulcrum pins 20 and pivotally connected at its intermediate point by each of the pins 18, the other end of the lever 16 being formed with a pressing portion 17 for bearing against the movable shaft 7. The other parts are similar to those of the first embodiment.

Figure 3C:
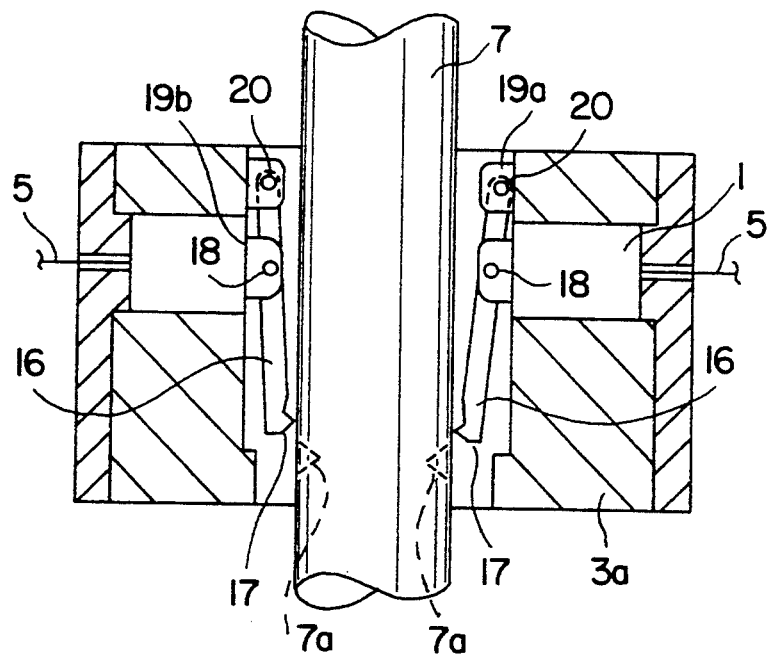
FIG. 3(c) is a longitudinal section of a modified version of the positioning mechanism of FIG. 3 (a)

The operation of the second embodiment is substantially similar to that of the first embodiment except that the levers 16 are used to enlarge the size of gap between the pressing portions 17 and the movable shaft 7. Such a gap size corresponds to the product of the gap size in the above-mentioned first embodiment and the ratio of the distance between the pressing portion 17 and the fulcrum pin 20 to the distance between the fulcrum pin 20 and the pin 18. As shown in FIG. 3(c), if each of the pressing portions 17 has a tip end having a section of a desired configuration, such as, a triangular section, and the peripheral surface of the movable shaft 7 is formed with three grooves 7(a) having a section corresponding to the configuration of the tip end of the pressing portion 17, they can be engaged by each other to stop and hold the movable shaft 7 reliably with a reduced pressing force when the electrostrictive effect elements 1 are energized to move the lever members 16 toward the movable shaft 7.

Although the illustrated second embodiment has been described as having three electrostrictive effect elements, the number and arrangement of the elements may be similar to those of the first embodiment.

Figure 4:
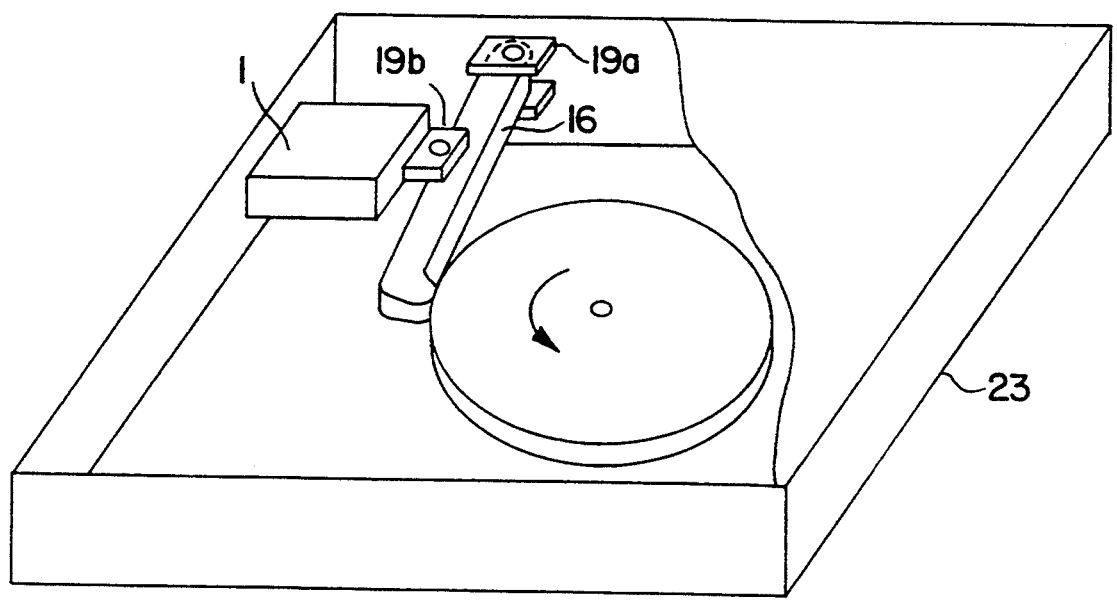
FIGS. 4 and 5 are perspective views of other embodiments of the present invention.
Figure 5:
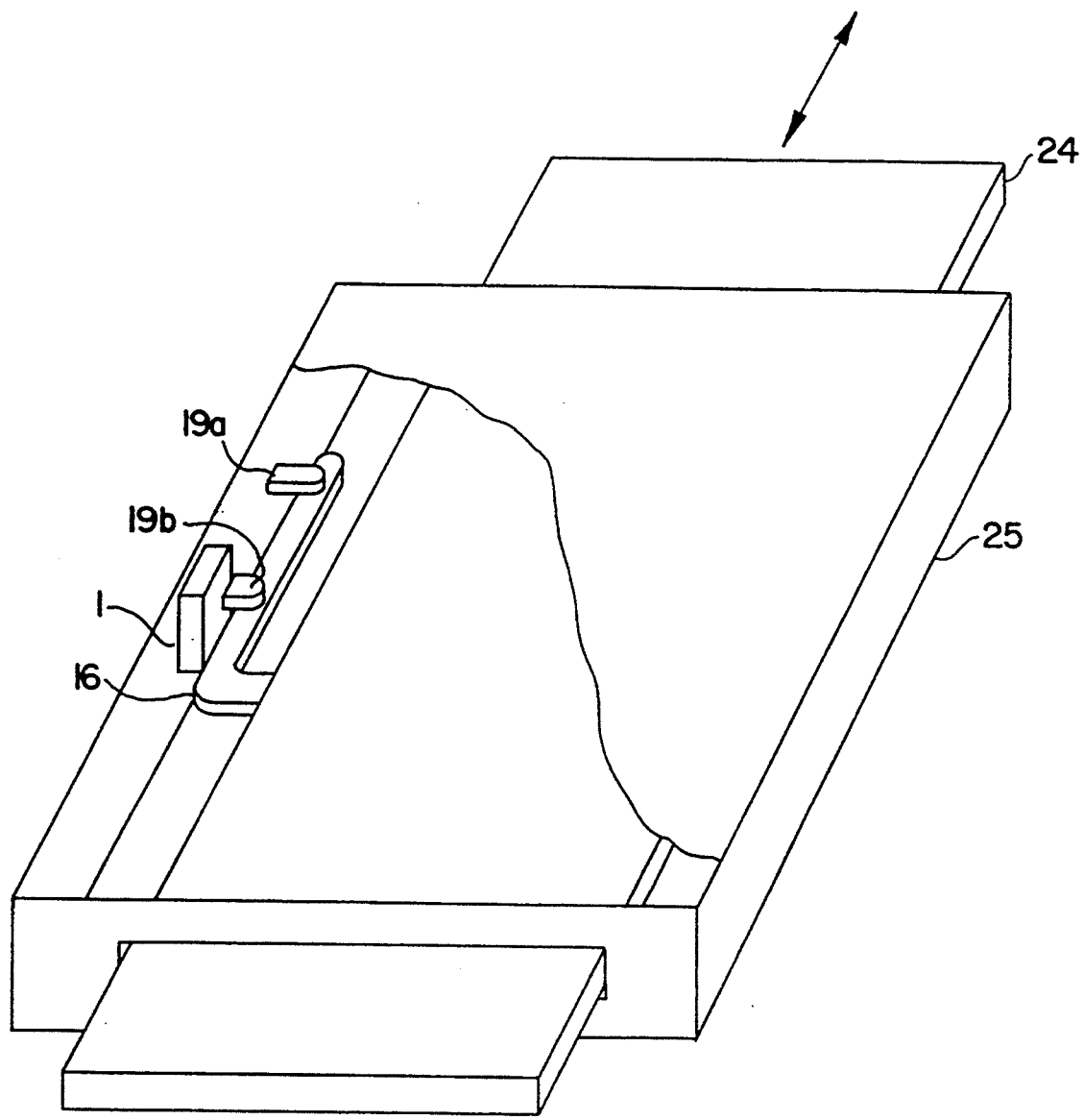

The positioning mechanism according to the second embodiment can have a wide range of applications since the space between the pressing portion and the movable or moving member can be increased. For example, as shown in FIG. 4, if the movable member is a disc-like member 22 which is rotationally movable and the housing is a rectangular parallelepiped 23 and includes the electrostrictive effect elements and the lever type pressing member 16, there can be provided a rotary index table which has an increased accuracy and can be manufactured inexpensively. If a plurality of linear grooves spaced equidistantly apart from one another are formed in an elongated plate-like movable member, there can be provided a linear indexing system. Thus, as shown in FIG. 5, the movable member can be a flat plate 24 supported in a plate-like housing 25.

As has been explained above in detail, since the positioning mechanism of the present invention includes at least one electrostrictive effect element rapidly actuatable which is mounted on the mechanical member for stopping and holding the movable member with the pressing force, the time required from the generation of a command for stopping and holding to the complete stopping of movement of the movable member can be greatly shortened to reduce the deviation of the movable member from the desired location when it is stopped. In order to accomplish such a superior operation, the positioning mechanism only includes at least one electrostrictive effect element without the need of other mechanical and expensive parts such as an electromagnetic clutch or brake mechanism. In accordance with the present invention, therefore, there can be provided a high-accuracy positioning mechanism which is less expensive to construct and more compact.

What is claimed is:

1. A sizing feed system comprising:
   a moving member for supporting in part;
   a linear drive connected to the moving member for driving the moving member;
   supporting means for supporting the moving member for movement along a linear path;
   a base, the linear drive and the supporting means being mounted on the base;
   a lever pivotally supported by the supporting means and having a pressing portion adapted to press a surface of the moving member;
   an electrostrictive effect element supported by the supporting means and coupled to the lever for applying a dressing force to the lever;
   a power source electrically connected to the electrostrictive effect element for energizing the electrostrictive effect element;
   sensing means for sensing a position of a part supported by the moving member; and
   control means for controlling the linear drive and the power source based on the position sensed by the sensing means.

* * * * *

UNITED STATES PATENT AND TRADEMARK OFFICE
CERTIFICATE OF CORRECTION

PATENT NO. : 5,351,789
DATED : OCTOBER 4, 1994
INVENTOR(S) : TOCHIHARA ET AL.

It is certified that error appears in the above-indentified patent and that said Letters Patent is hereby corrected as shown below:

Column 6, line 47, change "in" to --a--;

line 59, change "dressing" to --pressing--.

Signed and Sealed this

Fourteenth Day of February, 1995

*Attest:*

BRUCE LEHMAN

*Attesting Officer*     *Commissioner of Patents and Trademarks*